United States Patent
Jagaeus

(10) Patent No.: US 6,408,639 B1
(45) Date of Patent: Jun. 25, 2002

(54) DEVICE AND CONVEYOR BELT FOR MAKING PELLETS

(75) Inventor: Ulf Jagaeus, Viken (SE)

(73) Assignee: AGA AB, Lidingo (SE)

( * ) Notice: Subject to any disclaimer, the term of this patent is extended or adjusted under 35 U.S.C. 154(b) by 0 days.

(21) Appl. No.: 09/770,223

(22) Filed: Jan. 29, 2001

Related U.S. Application Data

(63) Continuation of application No. PCT/SE99/01310, filed on Jul. 26, 1999.

(30) Foreign Application Priority Data

Jul. 29, 1998 (SE) .............................................. 9802647

(51) Int. Cl.⁷ .......................... A23G 9/00; F25D 17/02; F25D 25/04
(52) U.S. Cl. .............................. 62/345; 62/374; 62/380
(58) Field of Search .......................... 62/374, 380, 378, 62/63, 72, 345

(56) References Cited

U.S. PATENT DOCUMENTS

| | | | | |
|---|---|---|---|---|
| 2,664,592 A | * | 1/1954 | Ingraham et al. .............. | 62/345 |
| 3,253,425 A | * | 5/1966 | McKissick .................... | 62/345 |
| 3,296,812 A | * | 1/1967 | Cloudy .......................... | 62/63 |
| 3,309,892 A | * | 3/1967 | O'Connell et al. ........... | 62/345 |
| 3,580,007 A | * | 5/1971 | Bauerlein ..................... | 62/345 |
| 3,685,313 A | * | 8/1972 | Rhodes ......................... | 62/345 |
| 4,087,265 A | * | 5/1978 | Benson .......................... | 62/63 |
| 6,012,293 A | * | 1/2000 | Andersson ..................... | 62/72 |

FOREIGN PATENT DOCUMENTS

| | | | |
|---|---|---|---|
| EP | 0626325 | * | 11/1994 |
| NL | 178986 | * | 4/1996 |
| SE | 430820 | * | 12/1983 |
| WO | 9102204 | * | 2/1991 |

* cited by examiner

*Primary Examiner*—William C. Doerrler
(74) *Attorney, Agent, or Firm*—Browdy and Neimark

(57) ABSTRACT

A device for making pellets of a material that can be made to solidify by changing its temperature having an endless belt (6) on which the material is placed at a feeding location and is conveyed along a processing path (7) to a guide roller (4) at a discharging location, and a member (2) for changing the temperature of the material on the belt (6) along the processing path (7). The endless belt (6) having a plurality of lamellae (9) transverse to the longitudinal direction of the belt, which are articulately juxtaposed and have at least one duct (11) which extends in the longitudinal direction of the belt without interruption between adjacent lamella and has, between the longitudinal edges of each lamella a ridge (13) transverse to the longitudinal direction of the belt of a height smaller than the depth of the duct (11).

10 Claims, 3 Drawing Sheets

DEVICE AND CONVEYOR BELT FOR MAKING PELLETS

Figure 1:
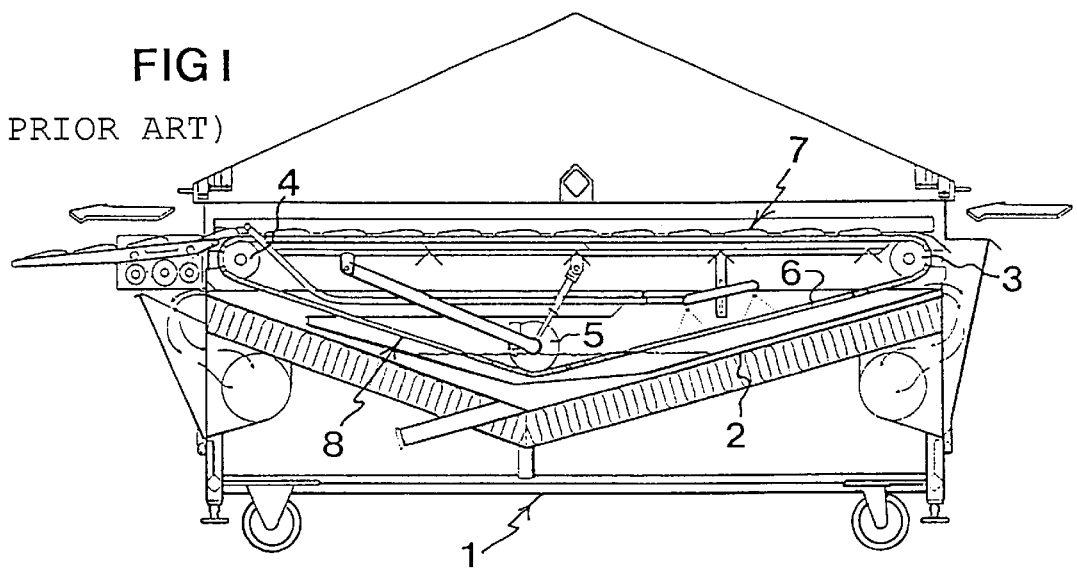

This application is a continuation of PCT/SE99/01310 filed Jul. 26, 1999.

BACKGROUND OF THE INVENTION

1. Technical Field of the Invention

The present invention generally relates to a device for making pellets. More specifically, the invention relates to the making of pellets of materials which have to be cooled or heated in order to obtain the solid form, i.e. whose temperature has to be changed. The invention also relates to a conveyor belt that is useful in such a device.

2. Prior Art

It is already known to make frozen pellets by freezing a liquid mass on a belt, or between two belts, that are sufficiently cooled for the mass to solidify to a carpet. Then the solidified carpet is divided into smaller pieces or pellets by breaking or sawing.

The resulting pieces may easily become different in size, and their shape often differs from the desired one. Moreover, considerable quantities of waste are produced, which at the best may be reused in the process.

Another difficulty in making pellets by cooling or heating on a belt is the tendency of many materials to adhere to the belt. Forming pellets by means of separate indentations in the belt thus usually leads to problems in the removal of the formed pellets from the indentations.

OBJECT AND SUMMARY OF THE INVENTION

An object of the present invention is thus to provide a device and a conveyor belt which substantially eliminate the problems of prior art regarding waste and adherence.

The invention thus relates to a device for making pellets of a material that can be made to solidify by changing its temperature. The device comprises an endless belt on which the material is placed at a feeding location and is conveyed along a processing path to a guide roller at a discharging location. Furthermore, the device comprises means for changing the temperature of the material on the belt along the processing path. According to the invention, the endless belt comprises a plurality of transverse lamellae, which are articulately juxtaposed and have at least one duct which is extended in the longitudinal direction of the belt and has, between the edges of each lamella against adjacent lamellae, a transverse ridge of a height smaller than the depth of the duct.

As a consequence of the above-described construction, the material, which is supplied to the duct and essentially fills it, forms a continuous rib, which as the conveyor belt reaches the guide roller has solidified at least over its surface contacting the conveyor belt, but alternatively over its whole circumferential surface also comprising the free surface of the rib. As the belt moves round the guide roller, the lamellae will gradually be detached from the rib. As a result of the position of the ridges on the inside of the respective lamellae, each portion of the rib between two adjacent ridges will be separated from the conveyor belt in two steps, which facilitates the detachment. The ridges form excellent fracture lines in the rib in such a manner that when being detached from the conveyor belt, the rib is easily broken into pellets of a length corresponding to the distance between two adjacent ridges, or at least may very easily be made to be broken into such pellets as it being detached from the belt.

In order to obtain a desirable capacity of the device, the endless belt preferably has a plurality of separate ducts, which conveniently are parallel. More particularly, the ducts should be designed in such a manner that the rib formed in each duct does not engage the rib in an adjacent duct.

Besides, the side surfaces of each duct preferably are inclined outwards from the duct so as to provide a clearance for detaching the rib from the duct. The same applies to the ridges, which thus should have a width that decreases towards their top.

Several different designs of the bottom of the duct are conceivable within the scope of the invention. For example, the bottom of the duct can be cup-shaped between each pair of ridges, but it may alternatively be substantially flat. The bottom of the duct may also exhibit one or more grooves having a width that gradually decreases downwards.

BRIEF DESCRIPTION OF THE INVENTION

Figure 2:
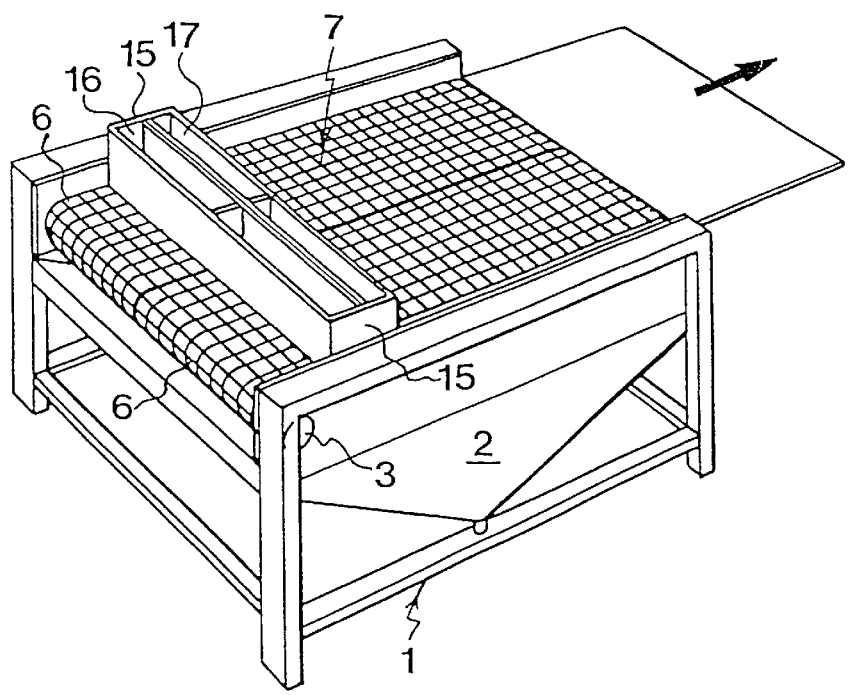
Figure 3:
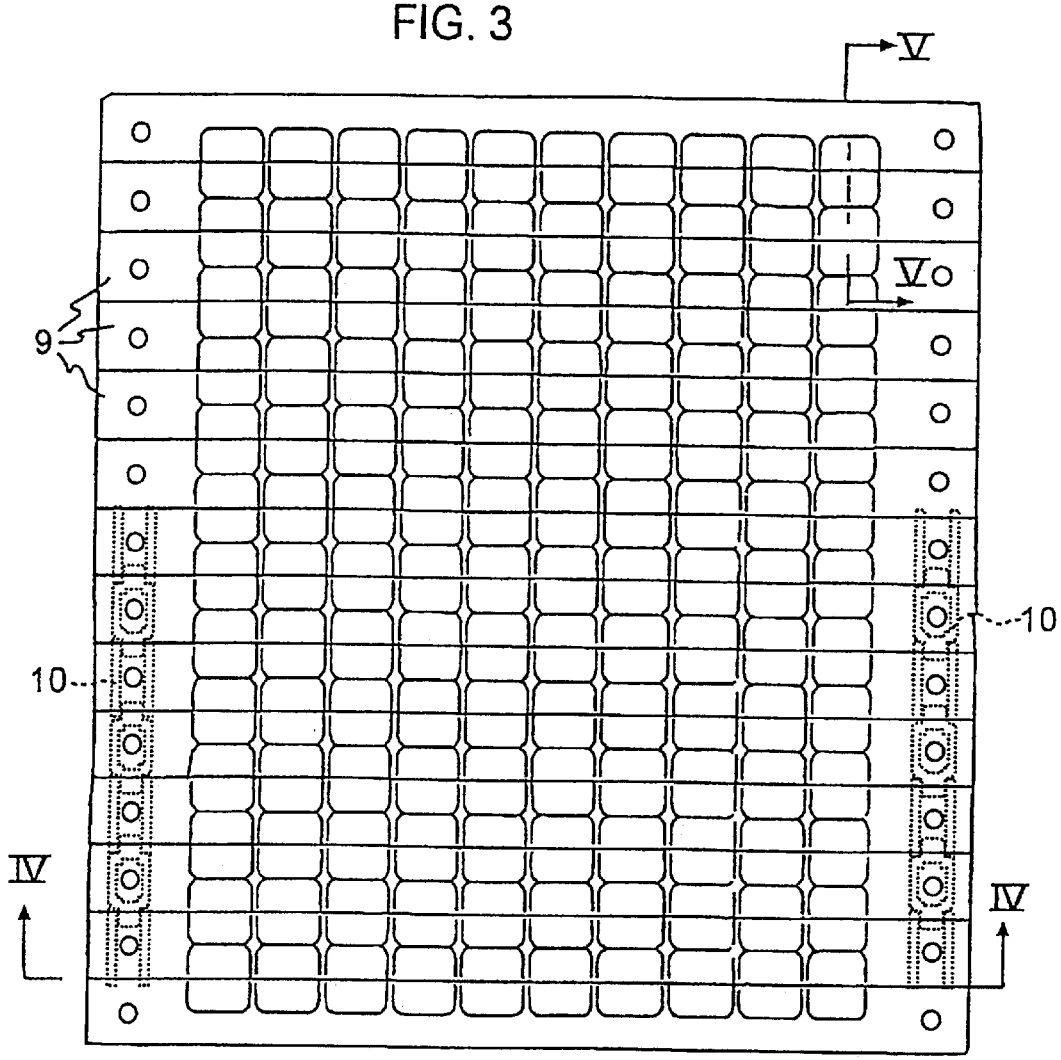
Figure 4:
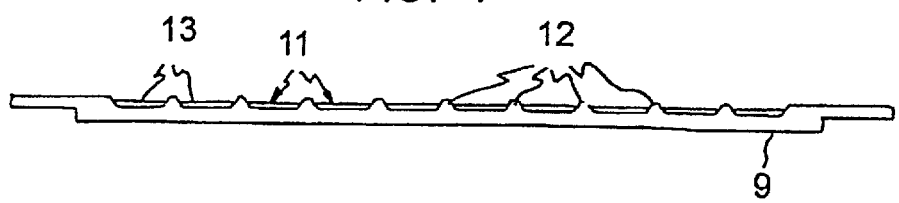
Figure 5:
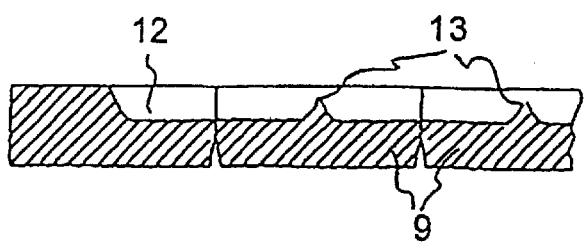
Figure 6:
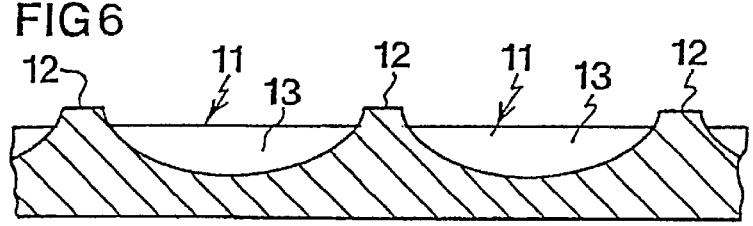
Figure 7:
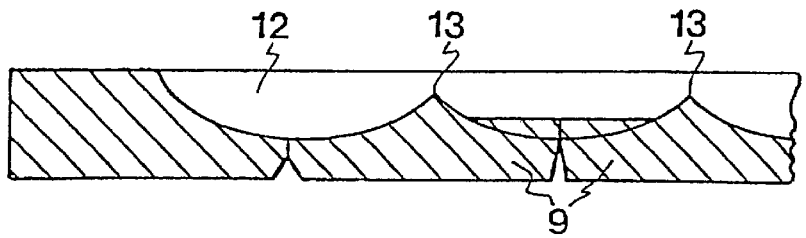
Figure 8:
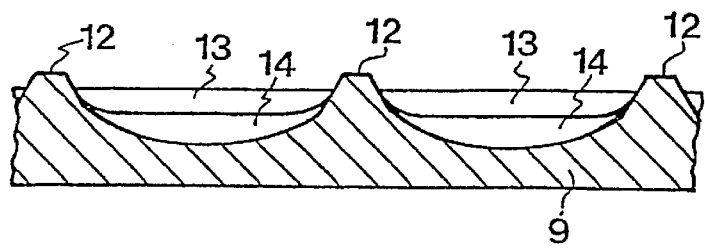
Figure 9:
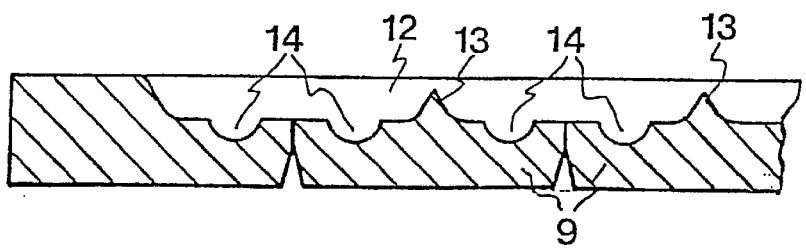
Figure 10:
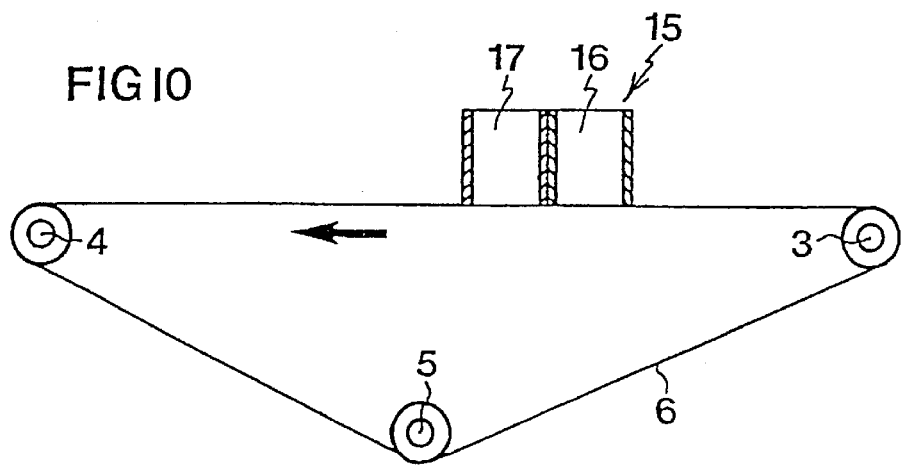

Embodiments of the device according to the invention will be described in more detail in the following with reference to the accompanying drawings, in which FIG. 1 is a longitudinal section of a prior-art freezing device, FIG. 2 is a schematic perspective view of an embodiment of a device according to the invention, FIG. 3 is a plan view of a conveyor belt according to the invention, the belt being usable in the device according to FIG. 2, FIG. 4 is a cross-sectional view of the conveyor belt along the line IV—IV in FIG. 3, FIG. 5 is a longitudinal section of the conveyor belt along the line V—V in FIG. 3, FIGS. 6 and 7 are a cross-sectional view and a longitudinal section, respectively, of a second embodiment of a conveyor belt that is usable in the device according to FIG. 2, FIGS. 8 and 9 are a cross-sectional view and a longitudinal section, respectively, of a second embodiment of a conveyor belt which is usable in the device according to FIG. 2, and FIG. 10 is a longitudinal section of a filling rough, which is usable in the device according to the invention.

The known freezing device shown in FIG. 1 comprises a stand 1 which supports a tub 2 and three parallel guide rollers 3–5 round which an endless belt 6 runs. The guide rollers 3 and 4 are located at one end each of the tub 2, whereas the guide roller 5 is arranged between the guide rollers 3 and 4 and near the bottom in a deeper portion of the tub 2.

The conveyor belt 6 follows an upper, horizontal belt path 7 from the guide roller 3 to the guide roller 4 and a return path 8 from the guide roller 4 via the guide roller 5 to the guide roller 3.

For cooling of the conveyor belt 6, liquid nitrogen may be supplied to the tub 2 in such a quantity that the conveyor belt 6 is passed through a bath of liquid nitrogen when passing under the guide roller 5.

In operation the conveyor belt 6, when passing over the guide roller 3, will have such a low temperature that products which are placed on the conveyor belt 6 at the beginning of the upper belt path 7 will be frozen at least in the superficial boundary layer adjacent to the conveyor belt 6. Thin products, whether they are solid or liquid when being placed on the conveyor belt 6, may be completely frozen when arriving at the guide roller 4, where transfer takes place to a subsequent processing step, which may be packaging. Other products may require final freezing after the transfer from the guide roller 4, for example in a freezer that utilises cold air as a coolant. In this case, the freezing of the surface layer in the shown device may serve to form a supporting crust of the product, the crust facilitating subsequent handling, for instance stopping the formation of marks of impression on the products, even if these are placed on a slightly uneven base.

The transfer can be facilitated by keeping the conveyor belt 6 at such a low temperature that no actual adherence occurs between the products and the conveyor belt 6. This usually requires temperatures below at least about −60° C.

With a view to obtaining a crust round the whole product, it is possible to use further means in addition to the described cooling of the conveyor belt 6, for. instance, cold gas may be blown or sprayed against the upper side of the products along the upper belt path 7 between the two guide rollers 3 and 4.

The embodiment of a device according to the invention shown in FIG. 2 may be substantially equal to the above-described device in FIG. 1 with the exception of the special conveyor belt used. The way of placing the product to be frozen on the conveyor belt may also be different, as exemplified in FIGS. 2 and 10.

The conveyor belt 6 shown in FIGS. 3–5 consists of a plurality of parallel lamellae 9, which extend over the whole width of the conveyor belt 6 and are articulated to each other along adjacent edges,. for instance by being secured to one link each of two chains 10 running in parallel at each longitudinal edge of the conveyor belt 6, in such manner that the conveyor belt 6 can move round the guide rollers 3–5.

As is evident from FIG. 4, a plurality of longitudinal ducts 11 are formed longitudinally on the upper side of the conveyor belt 6 along the belt path 7. The ducts 11 are parallel to each other and separated by longitudinal ridges 12, which are extended along the whole length of the conveyor belt 6 and constitute integrated parts of the respective lamellae 9. The ducts 11 have a substantially flat bottom and a depth that is the same as the height of the longitudinal ridges 12.

In addition, as is evident from FIGS. 3 and 5 each lamella 9 has a transverse ridge 13 which extends over the whole width of the duct 11 and has a height smaller than the depth of the duct 11 (or the height of the longitudinal ridges 12). The transverse ridges 13 have, just as the longitudinal ridges 12, a width decreasing upward from the bottom of the ducts 11.

It is thus evident that each duct 11 forms a continuous cavity consisting of a plurality of successively arranged partial spaces which are defined by two adjacent longitudinal ridges 12 and two adjacent transverse ridges 13. The partial spaces pass into each other over the top of the respective transverse ridges 13, which thus form a fracture line in the rib formed in the duct 11 owing to the fact that the thickness of the rib will be considerably smaller across the transverse ridge 13 than across the rest of the bottom of the duct 11. In the position where the transverse and longitudinal ridges intersect, their dimensions are enlarged, such that the partial spaces have rounded corners.

Figs 6 and 7 show an alternative embodiment of the ducts 11 of the lamellae 9. More particularly, the ducts 11 have a cup-shaped bottom in cross-section, which is evident from FIG. 6, and also in longitudinal section, as will be seen from FIG. 7.

FIGS. 8 and 9 show another variant of the shape of the ducts 11. More particularly, two grooves 14 are made in the bottom of each partial space, which have a width decreasing towards their bottom and a depth decreasing towards the respective longitudinal ridges 12.

Further variants of the shape of the bottom of the partial spaces are obviously possible as long as the ribs formed in the ducts 11 are not prevented from being detached from the ducts owing to the actual shape thereof.

FIG. 10 is a longitudinal section of a filling trough 15, which has the form of a sleeve and no bottom. Advantageously, the filling trough 15 is divided into at least two filling compartments 16 and 17, which are separated and successively arranged in the longitudinal direction of the conveyor belt 6, the lower edges of the filling compartments being positioned. in the plane that is defined by the longitudinal ribs 12. By using two such filling compartments 16, 17 arranged after each other, satisfactory filling of the ducts 11 is ensured at the level of the longitudinal ridges 12 and, thus, somewhat above the transverse ridges 13.

As indicated in FIG. 2, two or more belts 6 can be arranged next to each other and a trough 15 can be arranged for each such conveyor belt 6.

When the device is working, the filling trough 15 is conveniently kept filled, up to at least a predetermined level, with the material to be frozen, so that the material by its own weight fills the ducts 11 to the desired degree.

The one skilled in the art realises that the above-described embodiments of the device according to the invention may be modified in a plurality of respects within the scope of the invention, as defined by the appended claims. Naturally, the device can also be used together with heating means instead of cooling means to obtain the desired solidification of the surface of the material. When using a cooling means, the low temperatures of the conveyor belt 6 which have been used in prior art may, of course, facilitate the gradual detachment of the ribs from the conveyor belt 6 as it moves round the guide roller 4.

What is claimed is:

1. A device for making pellets of a material that can be made to solidify by changing its temperature, the device comprising an endless belt (6) on which the material is placed at a feeding location and is conveyed along a processing path (7) to a guide roller (4) at a discharging location, and means (2) for changing the temperature of the material on the belt (6) along the processing path (7), characterized in that the endless belt (6) comprises a plurality of lamellae (9) having a longitudinal length transverse to a longitudinal direction of the belt, which are articulately juxtaposed along the longitudinal length and have at least one duct (11) which extends in length in the longitudinal direction of the belt uninterrupted between adjacent lamella and has, between longitudinal edges of each lamella a ridge (13) transverse to the longitudinal direction of the belt of a height smaller than the depth of the duct (11).

2. A device as claimed in claim 1, characterised in that the endless belt (6) has a plurality of separate ducts (11).

3. A device as claimed in claim 1 or 2, characterised in that the side surfaces of each duct (11) are inclined outwards from the duct.

4. A device as claimed in claim 1, characterized in that each ridge (13) has a width that decreases towards its top.

5. A device as claimed in claim 1, characterised in that the bottom of the duct (11) is cup-shaped between each pair of adjacent ridges (13).

6. A device as claimed in claim 1, characterised in that the bottom of the duct (11) is substantially flat between each pair of adjacent ridges (13).

7. A device as claimed in claim 1, characterized in that the bottom of the duct (11) exhibits one or more grooves (14) having a width that gradually decreases downwards.

8. A device as claimed in claim 1, characterized by a filling trough (15) which extends across the width of the belt (6) and whose lower edges extend in a plane above the transverse ridges (13).

9. A device as claimed in claim 8, characterised in that the filling trough (15) has two compartments (16, 17), which are successively arranged in the longitudinal direction of the belt (6).

10. A conveyor belt for making pellets of a material that can be made to solidify by changing its temperature, characterized in that a plurality of lamellae (9) having a longitudinal length transverse to the longitudinal direction of the belt, which are articulately juxtaposed along the longitudinal length and have at least one duct (11) which extends in length in the longitudinal direction of the belt uninterrupted between adjacent lamella of the plurality of lamellae (9) and has, between the longitudinal edges of each lamella a ridge (13) transverse to the longitudinal direction of the belt of a height smaller than the depth of the duct (11).

* * * * *